(12) United States Patent
Chen

(10) Patent No.: US 6,848,802 B2
(45) Date of Patent: Feb. 1, 2005

(54) COMPUTER LIGHT WITH EXTENSIBLE ELECTRIC CONDUCTIVE WIRE

(76) Inventor: Chung-Yang M. Chen, 3F, No. 2, Lane 497, Chugn-Cheng Rd., Hsintien City, Taipei County (TW)

(*) Notice: Subject to any disclaimer, the term of this patent is extended or adjusted under 35 U.S.C. 154(b) by 24 days.

(21) Appl. No.: 10/245,321

(22) Filed: Sep. 18, 2002

(65) Prior Publication Data

US 2004/0052067 A1 Mar. 18, 2004

(51) Int. Cl.[7] ............................................. F21V 33/00
(52) U.S. Cl. ......................... 362/85; 362/191; 362/253; 362/387; 362/396
(58) Field of Search .......................... 362/85, 191, 253, 362/387, 396

(56) References Cited

U.S. PATENT DOCUMENTS

| | | | | |
|---|---|---|---|---|
| 3,733,478 A | * | 5/1973 | Barker | 362/387 |
| 4,369,487 A | * | 1/1983 | Carlow | 362/258 |
| 5,369,560 A | * | 11/1994 | Friedman | 362/396 |
| 5,379,201 A | * | 1/1995 | Friedman | 362/191 |
| 5,552,973 A | * | 9/1996 | Hsu | 362/192 |
| 6,099,149 A | * | 8/2000 | Chappell | 362/396 |
| 6,561,668 B2 | * | 5/2003 | Katayama et al. | 362/85 |

* cited by examiner

*Primary Examiner*—Stephen Husar
*Assistant Examiner*—James W Cranson
(74) *Attorney, Agent, or Firm*—Troxell Law Office PLLC

(57) ABSTRACT

Computer light structure with extensible electric conductive wire, including a main body, a housing, an upper cover and a plug unit. A clip device and a lighting device are disposed on the main body. The housing encloses a lower side of the main body to define an interior space in which a winding device is accommodated. The clip device serves to clip an external article such as the panel of a portable computer for fixing the lighting device thereon to provide sufficient illumination. After used, the electric conductive wire can be quickly and smoothly wound back by the winding device to avoid tangle of the wire. In addition, the plug unit is clipped by the clip device to avoid random placement.

17 Claims, 5 Drawing Sheets

COMPUTER LIGHT WITH EXTENSIBLE ELECTRIC CONDUCTIVE WIRE

BACKGROUND OF THE INVENTION

The present invention is related to a computer light with extensible electric conductive wire, which is able to quickly and smoothly wind back the wire to avoid tangle thereof.

Portable computers are widely used nowadays. However, in some cases, it is still inconvenient to use the portable computer. For example, in a dim place, a user cannot conveniently operate the computer and an auxiliary illuminating device will be needed.

A computer light has been developed for providing sufficient illumination for a user to operate the portable computer. Such computer light includes an extension conductive wire one end of which is adapted to be plugged into the portable computer, while the other end of which is connected with a lighting device.

The above computer light has some shortcomings in use as follows:

1. It is uneasy to store the computer light. When not used, the conductive wire of the lighting device is generally wound back and forth and tied with a rubber ring and soft string. Therefore, it is troublesome to store the computer light and the appearance thereof will be poor. Moreover, after the conductive wire is unwound and stretched for next use, the conductive wire will be irregularly crimped. This leads to inconvenience in use.
2. The conventional computer light is not durable. The extension conductive wire is exposed to outer side. In addition, after repeatedly curled and stretched, the wire tends to fail or break. This will lead to poor contact.
3. The conductive wire of the conventional computer light is easy to tangle. The conductive wire has a considerable length. In the case that after used, the conductive wire is not properly wound into a limited length, the conductive wire is easy to loosen and swing. As a result, the conductive wire tends to tangle with external article. This leads to inconvenience in use.

SUMMARY OF THE INVENTION

It is therefore a primary object of the present invention to provide an improved computer light structure with extensible electric conductive wire. The computer light includes a main body, a housing, an upper cover and a plug unit. The housing encloses defines an interior space in which a winding device is accommodated. After used, the electric conductive wire can be quickly and smoothly wound back by the winding device to avoid tangle of the wire. The winding device includes a resiliently rotatable winding reel for winding or unwinding the wire. A resilient member is disposed in the winding reel for constantly providing resiliently restoring force to drive the winding reel to wind back the wire.

It is a further object of the present invention to provide the above computer light in which when not used, the wire is smoothly wound into the winding device and the plug unit is clipped between the clip device and the plug recess of the main body. Then the upper cover is overlaid on the top face of the main body to cover and prevent the clip device, lighting device and the plug unit from being damaged or contaminated.

It is still a further object of the present invention to provide the above computer light in which in use, the upper cover is reversely fitted onto the housing to cover the housing without occupying other room and being randomly placed.

The present invention can be best understood through the following description and accompanying drawings wherein:

DETAILED DESCRIPTION OF THE PREFERRED EMBODIMENT

Figure 1:
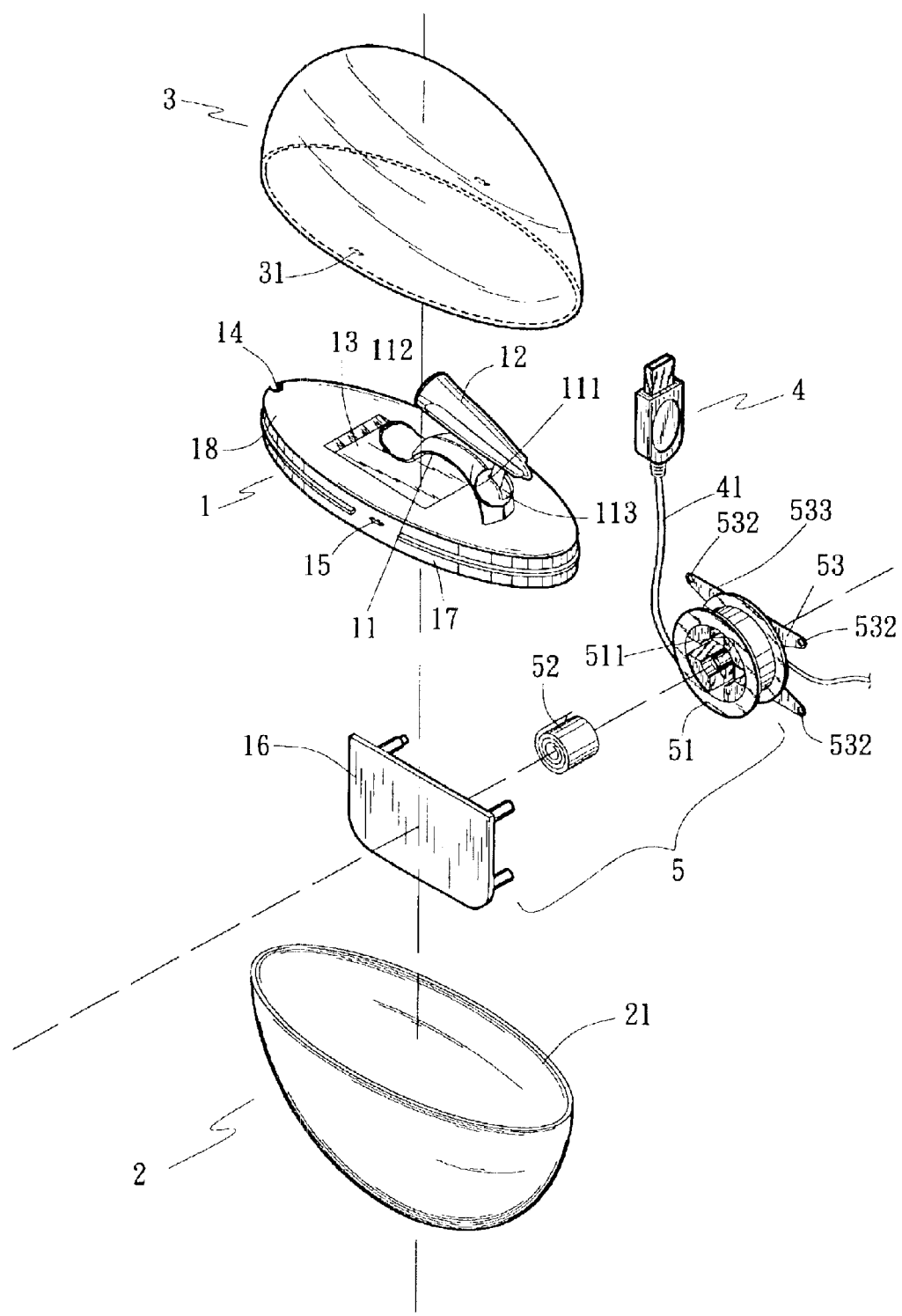
FIG. 1 is a perspective exploded view of the computer light of the present invention.
Figure 2:
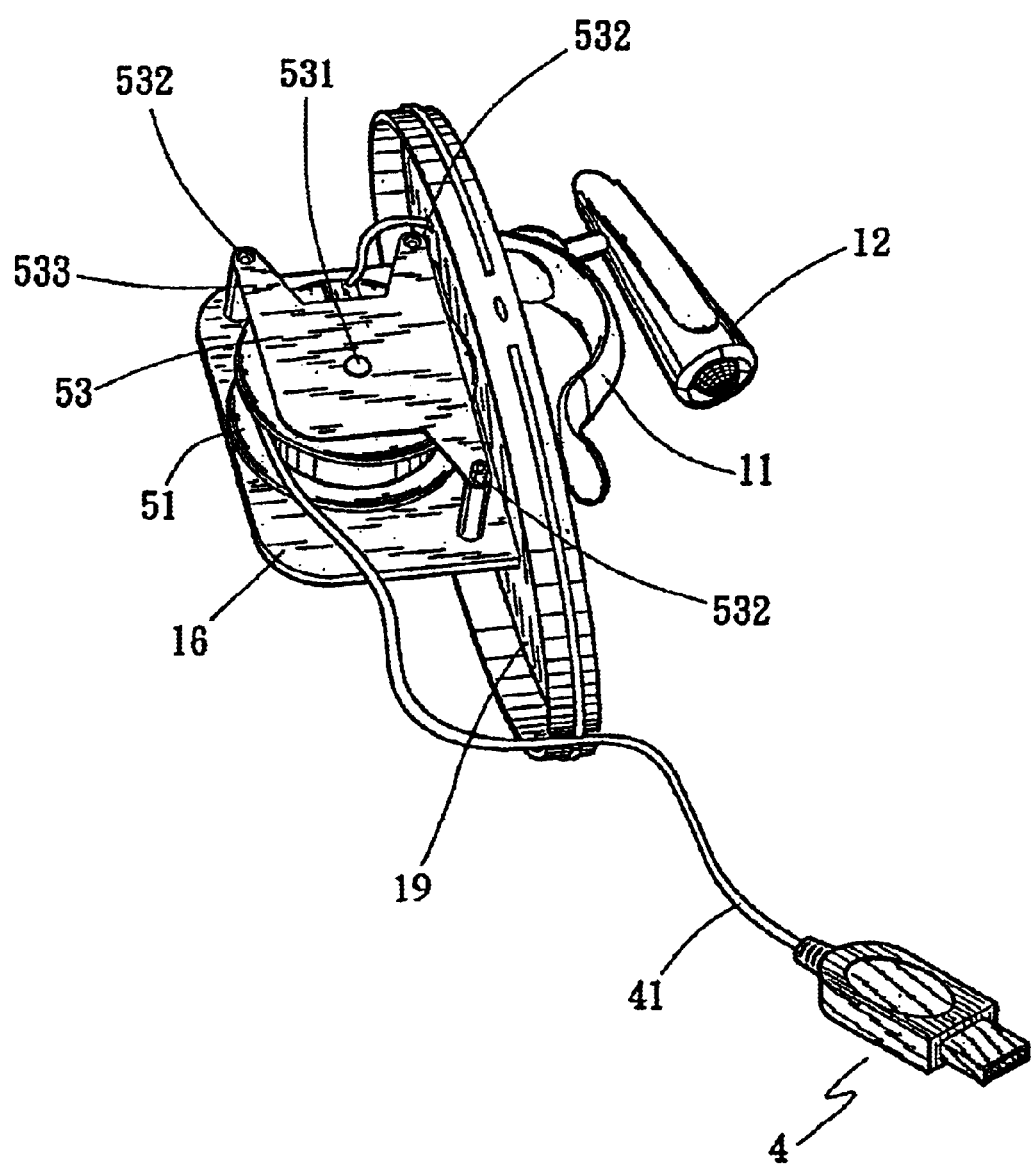
FIG. 2 is a perspective view of the winding device of the computer light of the present invention.
Figure 3:
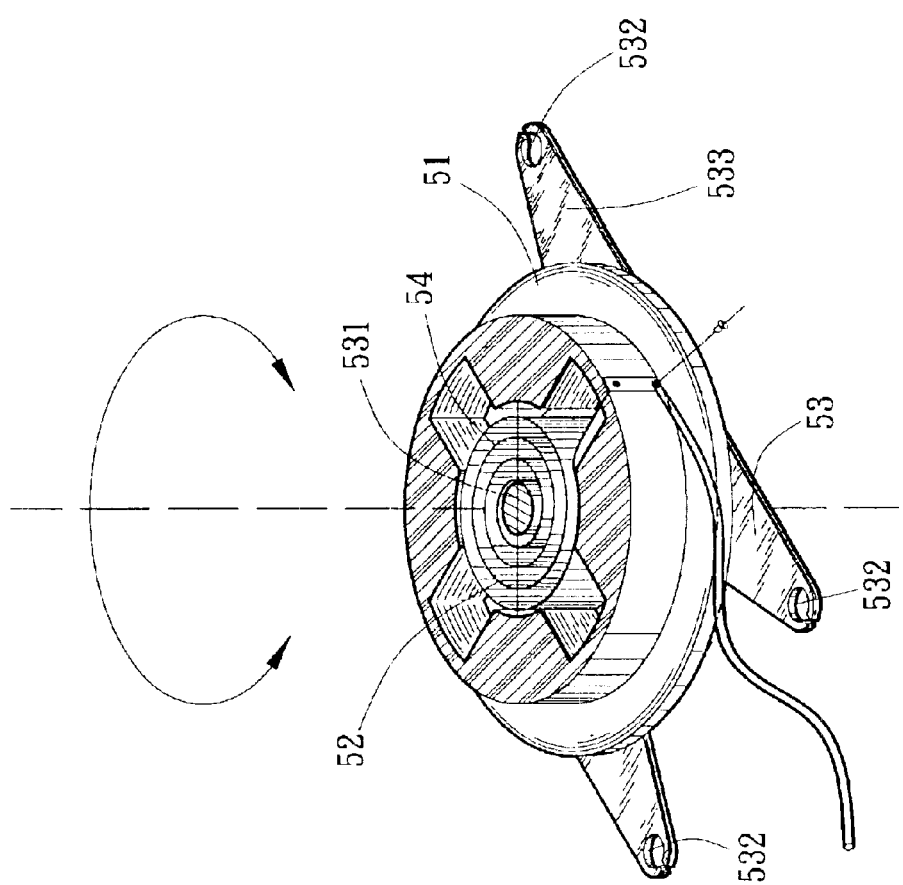
FIG. 3 is a sectional view of the winding device of the computer light of the present invention, seen from the other side.
Figure 4:
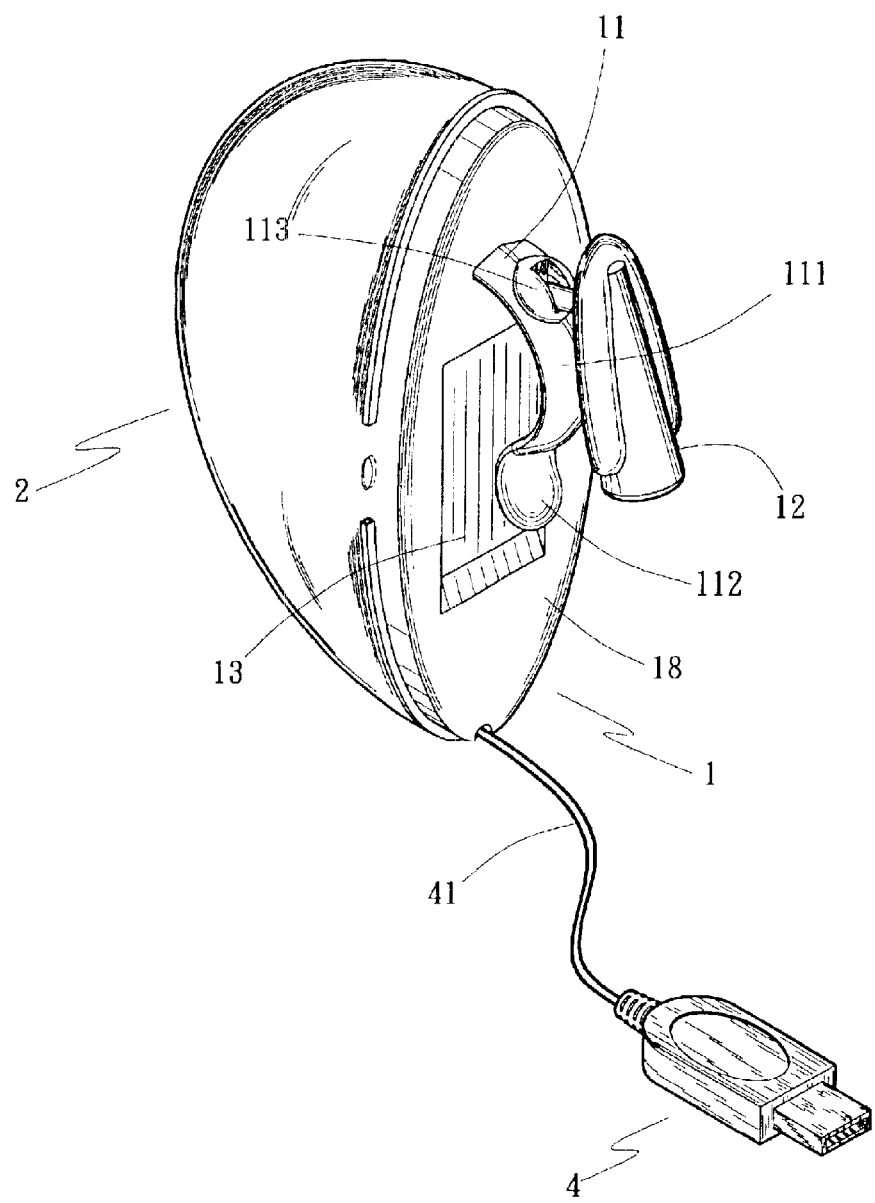
FIG. 4 is a perspective assembled view of the computer light of the present invention.
Figure 5:
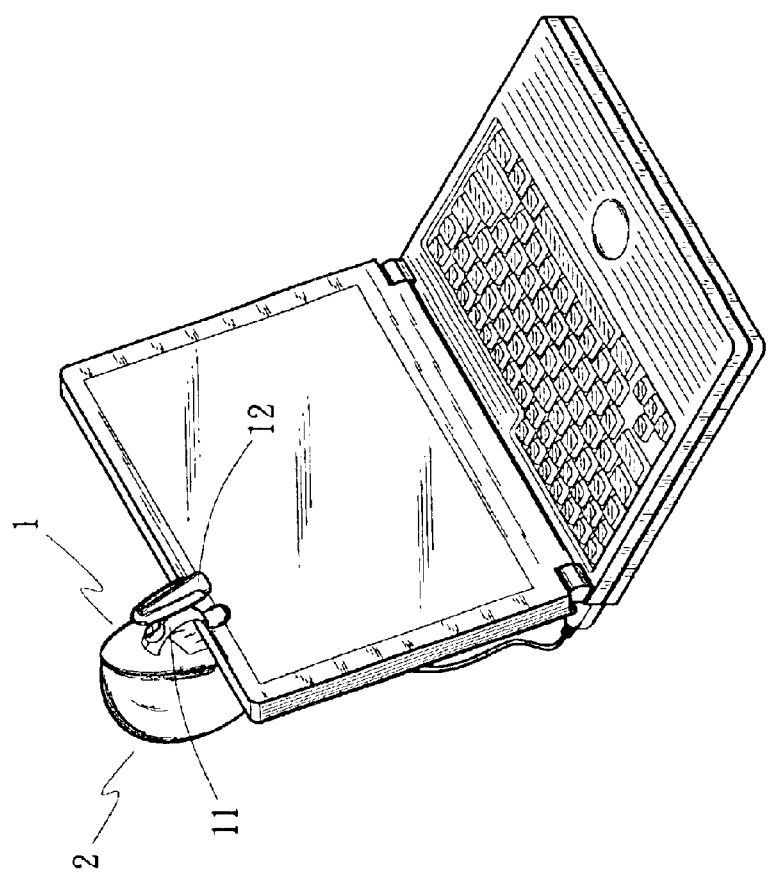
FIG. 5 is a perspective view showing an application of the computer light of the present invention to a portable computer.

Please refer to FIGS. 1 to 5. The computer light of the present invention includes a main body 1, a housing 2, an upper cover 3 and a plug unit 4. A clip device 11 is disposed a top face 18 on the main body 1. The clip device 11 is cantilevered clip formed with a resilient bight section 111 and a press end 112. A lighting device 12 is movably supported on the bright section 111 by a universal joint 113. A plug recess 13 is formed on the top face 18 of the main body 1 corresponding to the press end 112. The main body 1 is further formed with an extension hole 14 through which an electrical conductive wire 41 of the lighting device 4 passes. A locating board 16 is disposed under the main body 1 on the bottom face 19 and a winding device 5 is mounted on the locating board 16. An engaging section 15 is formed on a lateral side of the main body 1. A peripheral rib 17 is formed along the periphery of the main body 1.

The housing 2 has an interior space 21 in which the locating board 16 and the winding device 5 are accommodated. The upper cover 3 is formed an engaging section 31 adapted to the engaging section 15 of the main body 1 for engaging therewith to cover the main body 1.

The winding device 5 includes a winding reel 51 which is resiliently rotatable and a resilient member 52 providing resiliently restoring force to drive the winding reel 51. A pivot shaft 531 is disposed on a fixing board 53. The fixing board 53 has multiple extending plates 533 and fixing holes 532 for fixing the fixing board 53 on the locating board 16. A sufficient length of electric conductive wire 41 is wound around the winding reel 51. An end of the wire 41 is connected with the plug unit 4, while the other end of the wire 41 is connected with the lighting device 12. A pivot hole 511 is formed at the center of the winding reel 51. One end of the resilient member 52 is connected with the pivot shaft 531 of the fixing board 53, while the other end of the resilient member 52 is connected with the winding reel 51. In a preferred embodiment, the pivot shaft 531 is passed through the metal fixing board 53 and electrically connected with the lighting device 12. The electric conductive wire 41 wound on the winding reel 51 is electrically connected with the other end of the resilient member 52 to form a circuit.

The pivot shaft 531 of the fixing board 53 is pivotally fitted in the pivot hole 511 of the winding reel 51, whereby the winding reel 51 can be smoothly rotated to wind or unwind the wire 41. The resilient member 52 is connected between the pivot shaft 531 of the fixing board 53 and the winding reel 51. The resilient member 52 constantly provides resilient force for winding the wire into the winding reel. Therefore, it is easy to wind and store the wire without tangle. Therefore, the using life of the wire is prolonged. The lighting device 12 is disposed on the universal joint 113 of the clip device 11 so that the illuminating direction of the light device 12 can be adjusted. In not used state, the wire 41 is first wound into the winding device 5 and the plug unit 4 is clipped between the clip device 11 and the plug recess 13. Then the upper cover 3 is overlaid on the top face of the main body 1 with the engaging sections 31, 15 engaged with each other. Accordingly, the upper cover 3 can cover the clip device 11, lighting device 12 and the plug unit 4. In use, the upper cover 3 is reversely fitted onto the housing 2 to cover the housing 2. The engaging sections 31, 15 are also engaged with each other. Therefore, the upper cover 3 will not be randomly placed.

The above embodiment is only used to illustrate the present invention, not intended to limit the scope thereof. Many modifications of the above embodiment can be made without departing from the spirit of the present invention.

What is claimed is:

1. A computer light with an electric conductive wire comprising:
  a) a main body having a winding device and a clip device, the winding device being located on a bottom face of the main body, the clip device being located on a top face of the main body, the electric conductive wire located on the winding device and movable between extended and retracted positions;
  b) a lighting device connected to the main body, the electric conductive wire being connected at a first end to a plug unit and connected at a second end to the lighting device;
  c) a housing having an interior, the winding device located in the interior of the housing; and
  d) an upper cover removably connected to the main body, wherein the clip device is located in an interior of the upper cover when the upper cover is connected to the main body.

2. The computer light according to claim 1, wherein the lighting device is connected to the clip device of the main body.

3. The computer light according to claim 1, wherein the lighting device is movably connected to the clip device of the main body by a universal joint.

4. The computer light according to claim 2, wherein the lighting device is movably connected to the clip device of the main body by a universal joint.

5. The computer light according to claim 1, wherein the winding device includes a resiliently rotatable winding wheel, a fixing board, and an resilient member connected between the winding wheel and the fixing board.

6. The computer light according to claim 1, further comprising a locating board connected to the bottom face of the main body and the winding device is connected to the locating board.

7. The computer light according to claim 5, further comprising a locating board connected to the bottom face of the main body and the winding device is connected to the locating board.

8. The computer light according to claim 7, wherein the fixing board includes a pivot shaft, a plurality of extending plates and a fixing hole located on each of the plurality of extending plates for connecting the fixing board to the locating board, the resilient member is connected to the pivot shaft of the fixing board.

9. The computer light according to claim 1, wherein the clip device includes a bight section and a press end, the clip device is connected to the top face of the main body at a first end of the bight section, the press end is located on the second end of the bight section.

10. The computer light according to claim 2, wherein the clip device includes a bight section and a press end, the clip device is connected to the top face of the main body at a first end of the bight section, the press end is located on the second end of the bight section.

11. The computer light according to claim 9, wherein the main body includes a plug recess located on the top face and aligning with the press end of the clip device.

12. The computer light according to claim 10, wherein the main body includes a plug recess located on the top face and aligning with the press end of the clip device.

13. The computer light according to claim 3, wherein the clip device includes a bight section and a press end, the clip device is connected to the top face of the main body at a first end of the bight section, the press end is located on the second end of the bight section.

14. The computer light according to claim 4, wherein the clip device includes a bight section and a press end, the clip device is connected to the top face of the main body at a first end of the bight section, the press end is located on the second end of the bight section.

15. The computer light according to claim 1, wherein the main body includes a first engaging section located on a lateral side thereof and a peripheral rib located on an outer periphery thereof.

16. The computer light according to claim 1, wherein the main body includes a first engaging section, the upper cover includes a second engaging section, the first engaging section engaging the second engaging section.

17. The computer light according to claim 1, wherein the main body includes an extension hole through which the electric conductive wire is inserted.

* * * * *